United States Patent [19]

Arend et al.

[11] 3,821,176
[45] June 28, 1974

[54] ACRYLONITRILE-(CO)-POLYMERS WITH ANTISTATIC FINISHES

[75] Inventors: Gunter Arend; Eduard Radlmann; Gunther Nischk, all of Dormagen, Germany

[73] Assignee: Bayer Aktiengesellschaft, Leverkusen, Germany

[22] Filed: Dec. 1, 1972

[21] Appl. No.: 311,147

[30] Foreign Application Priority Data
Dec. 2, 1971   Germany............................ 2159833

[52] U.S. Cl.. 260/85.5 R, 260/32.6 N, 260/79.3 M, 260/88.7 B, 260/DIG. 16, 260/DIG. 19, 260/DIG. 21
[51] Int. Cl................................ C08f 3/76, C08f 15/22

[58] Field of Search ..... 260/88.7 R, 88.7 B, 85.5 R, 260/85.5 S, DIG. 16, DIG. 19, DIG. 21

[56] References Cited
UNITED STATES PATENTS
3,332,912   7/1967   Rochlitz .......................... 260/88.7 B

*Primary Examiner*—Harry Wong, Jr.
*Attorney, Agent, or Firm*—Plumley & Tyner

[57] ABSTRACT

The invention relates to acrylonitrile-(co)-polymers treated with antistatic finishes which are obtained by reacting hydroxyalkylated alcohols, amines or fatty acids with maleic acid anhydride, followed by an addition reaction with bisulphites or phosphites.

8 Claims, No Drawings

ACRYLONITRILE-(CO)-POLYMERS WITH ANTISTATIC FINISHES

This invention relates to acrylonitrile polymers which have been treated with antistatic finishes.

Shaped products of polyacrylonitrile or of copolymers which consist mainly of acrylonitrile, especially fibres made of these substances, become electrostatically charged by friction. The possible commercial applications of these polymers are therefore severely restricted. In practice it is found that all acrylonitrile polymers or copolymers which have an electrical surface resistance greater than $5 \times 10^{11}$ Ohm, measured on the fibres, carry an electrical charge which is unpleasant to experience.

Compounds which are suitable for use as antistatic finishes for high polymer products are therefore in general those which increase the electrical surface conductivity of the polymers. The substances which increase the conductivity may either be applied to the surface of the shaped product after shaping or may be incorporated in the molten or dissolved polymer before it is shaped.

Antistatic agents which are applied to the surface are particularly sensitive to mechanical and solvolytic influences. Products finished by this method rapidly lose their antistatic character, especially as a result of washing or cleaning. A much more permanent antistatic finish may be achieved by incorporating the antistatic agent with the polymer substance, although most of the known antistatic agents normally applied to the surface are ineffective when incorporated with the polymer substance. The reason for this, among other things, are the thermochemical changes which occur during the shaping process. An essential requirement of a satisfactory antistatic additive is that it must be compatible with the polymer melt or solution. Many of the known surface antistatic agents do not meet this requirement.

The antistatic agents previously known belong to the following classes of compounds: Phosphoric acid amides, ureas, dithiocarbonate and aminocarboxylic acid amides. Some of these compounds are only obtainable with difficulty and expensive, and in other cases the antistatic effect obtained with these relatively low molecular weight compounds is not sufficiently resistant to detergents and solvents.

It has now been found that these disadvantages can be reduced or substantially obviated if compounds which may be prepared by reacting hydroxyalkylated alcohols, amines or fatty acids with maleic acid anhydride, followed by an addition reaction with bisulphites or phosphites, are incorporated with acrylonitrile polymers as antistatic agents before the polymers are shaped. When incorporated in acrylonitrile polymers or copolymers preferably in quantities of 1 to 20 percent by weight, based on the total quantity of mixture, these compounds impart very satisfactory, durable and wash-resistant antistatic properties to the polymers.

This effect is to some extent also observed in other synthetic organic polymers.

This invention thus relates to acrylonitrile polymers which contain preferably 1 – 20 percent by weight, based on the total mixture, of one or more compounds of the general formula

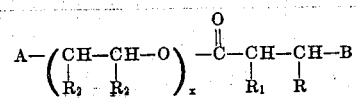

in which
R and $R_1$ are different from each other and represent hydrogen,

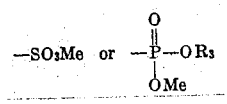

in which
Me stands for Li, Na, K, $NH_4$, alkylammonium, $Mg_{/2}$, $Ca_{/2}$ or $Ba_{/2}$,
$R_2$ represents hydrogen or methyl,
$R_3$ represents a $C_1$–$C_5$ alkyl radical and
A represents radicals of the following formulae

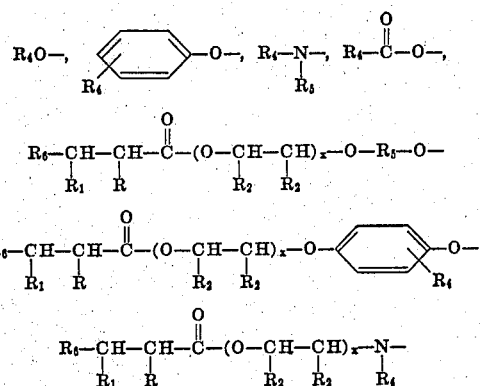

in which
$R_4$ denotes a $C_1$–$C_{30}$ alkyl radical,
$R_5$ denotes a $C_3$–$C_{30}$ alkyl radical and
$R_6$ denotes the radicals —$CO_2H$ and $CO_2Me$,
B denotes hydrogen, $CO_2H$, $CO_2Me$ or

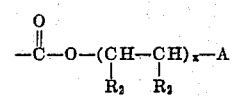

and
x represents integers of from 1 to 50.

The polymers according to the invention may be obtained by adding one or more compounds to acrylonitrile polymers which are capable of being shaped, in particular to spinnable solutions of acrylonitrile polymers or copolymers, in quantities of preferably 1 to 20 percent by weight, based on the solids content. The acrylonitrile polymers in particular solutions are then processed by one of the usual processes, e.g. to produce foils or threads.

The antistatic agents according to the invention may be prepared e.g.: by reacting the corresponding polyether alcohol with an excess of maleic acid anhydride amounting to 0 to 10 mols percent based on each functional OH group, the reaction being carried out in the melt or in an inert solvent. The resulting maleic acid semiester is either reacted in the absence of solvent with a trialkylphosphite, preferably at temperatures of 80° to 100°C, or, after neutralisation with a suitable base, it is reacted in aqueous or aqueous/alcoholic solution, at temperatures preferably between 30° and 110°C, with a compound which yields bisulphite ions on hydrolysis. The progress of the addition reaction may be followed by iodometric titration. Of the resulting phosphoric acid dialkyl esters, one alkyl radical is removed by saponification with one equivalent of a suitable base, preferably at 20° to 100°C, before the next process is carried out, whereas sulphonates obtained by bisulphite addition are worked up directly. Any salts present as by-products are removed by adding a polar solvent in which these salts are insoluble or only sparingly soluble, and the reaction mixture is stirred vigorously with heating and then filtered under suction, if necessary after the addition of about 3 percent of active charcoal or Fuller's earth. Particularly suitable solvents are methanol, ethanol, dimethylformamide, dimethylacetamide, N-methylpyrrolidone and dimethylsulphoxide.

To prepare the carboxylic acid maleic ester sulphonates, 40 to 100 percent of the equivalent quantity of a mineral acid are added to the solution. In some cases, it is advisable to solidify the reaction immediately after the bisulphite addition reaction is completed and before the polyether sulphonate is recovered by dissolving it with one of the solvents mentioned above. The polyether sulphonates according to the invention are then isolated by evaporating off the solvent; alternatively these solutions may be added directly to the polyacrylonitrile spinning solutions.

Other antistatic compounds according to the invention may be obtained by reacting suitable polyether alcohols with maleic acid anhydride or maleic or fumaric acid in a molar ratio of 2 : 1 at 150° to 200°C in a vacuum to form the diester which is then reacted with sodium bisulphite as described above and the bisulphite addition product is isolated.

Another method of preparation of the phosphosuccinic acid esters according to the invention consists in the alcoholate catalysed addition of dialkylphosphites to the maleic ester or maleic semiester double bond. This method should only be used for maleic acid diesters of suitable polyether alcohols because of the possible ester interchange of the maleic acid ester or semiester with the alcoholate which may occur in this reaction.

Antistatic compounds according to the invention may also be obtained by reacting a suitable anhydrous polyether alcohol, optionally in an inert solvent, with the internal anhydride of β-sulphopropionic acid at temperatures of between 0°C and 70°C and then carefully neutralising the reaction mixture with a suitable base. The reaction may also be carried out in the presence of a tertiary amine such as trimethylamine, triethylamine, dimethylaniline or pyridine. The sulphopropionic acid anhydride can easily be prepared by the method described in U.S. Pat. No. 2,383,320.

The following are examples of suitable polyether alcohols which may advantageously be used in accordance with the invention: Ethoxylated alkylphenols, in particular ethoxylated nonyl phenol, ethoxylated fatty alcohols, in particular ethoxylated lauryl, myristyl, cetyl, stearyl and oleyl alcohol; ethoxylated diols, in particular ethoxylated 2,2-dimethyl-propane-1,3-diol, ethoxylated hexane-1,6-diol, ethoxylated 2,2,4- and 2,4,4-trimethyl-hexane-1,6-diol, ethoxylated octadecane-1,12-diol, ethoxylated cyclohexane-1,4-diol, ethoxylated 1,4-bis-hydroxymethylcyclohexane, ethoxylated hydroquinone, ethoxylated alkylamines, in particular ethoxylated laurylamine, cetylamine and stearylamine, and ethoxylated fatty acids or resinic acids, in particular ethoxylated myristic, lauric, palmitic, stearic, oleic and abietic acid; ethoxylated natural fats and oils, in particular ethoxylated castor oil and soya bean oil. The ethylene oxide unit may in all cases be partly or completely replaced by propylene oxide units.

Any compounds which are capable of forming hydrogen sulphite ions by a hydrolytic equilibrium reaction are suitable for the hydrogen sulphite addition to the maleic acid ester or semiester double bond. The following are specific examples: Alkali metal and alkaline earth metal sulphites, alkali metal and alkaline earth metal bisulphites, alkali metal pyrosulphites, ammonium sulphite, ammonium bisulphite and sulphur dioxide in combination with suitable bases.

All dialkyl and trialkylphosphites are suitable for the phosphite addition to the maleic ester or semiester double bond, in particular dimethylphosphite, diethylphosphite, trimethylphosphite and triethylphosphite.

The following are given as examples of antistatically active compounds according to the invention:

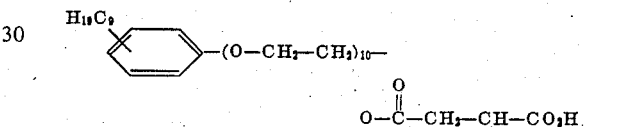

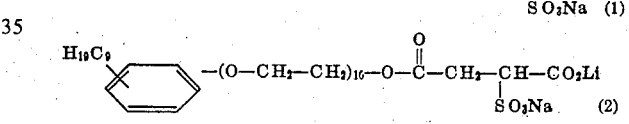

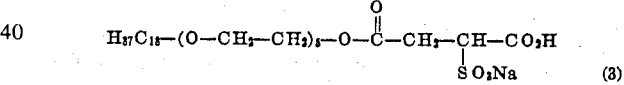

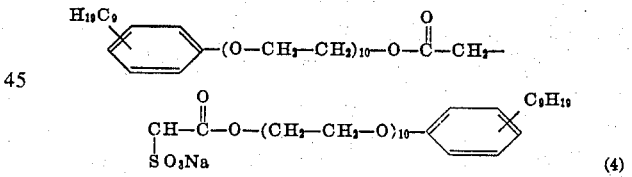

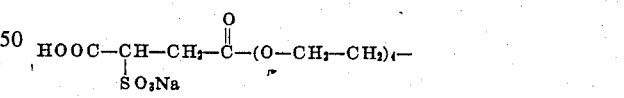

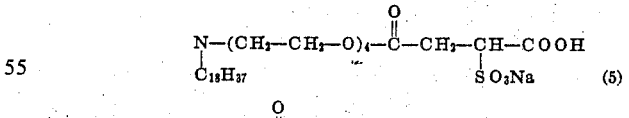

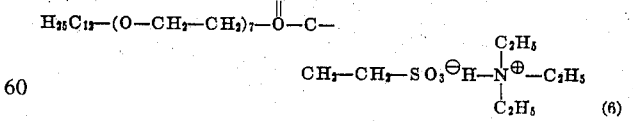

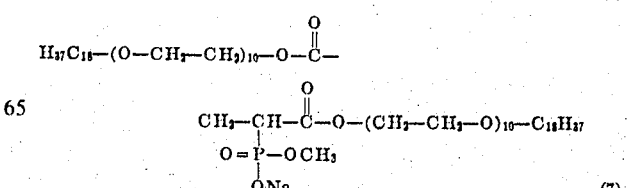

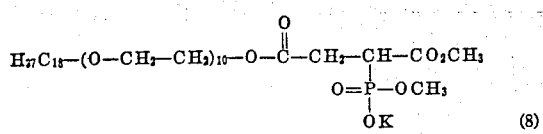

(8)

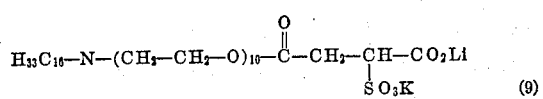

(9)

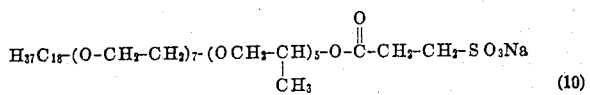

(10)

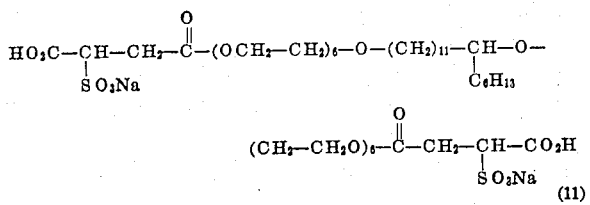

(11)

(12)

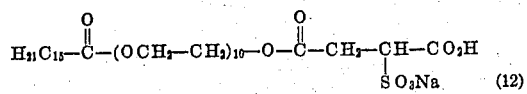

(13)

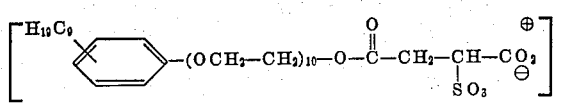

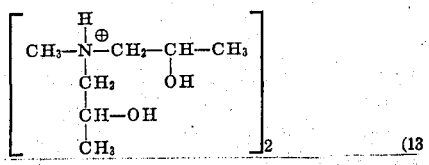

(14)
(n=5–100)

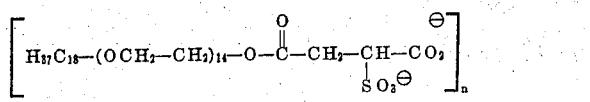

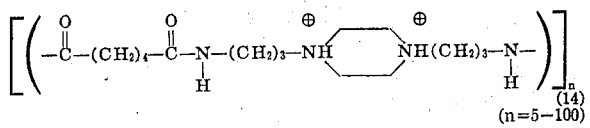

(15)
(n=5–20)

Apart from pure polyacrylonitrile, suitable acrylonitrile polymers for the purpose of this invention are those which contain at least 60 percent by weight of polymerised acrylonitrile and may also contain other copolymerisable vinyl and acrylic or methacrylic compounds. The following are mentioned as examples of copolymerisable compounds: (Meth)acrylic acid esters, (meth)acrylic acid amides, vinyl chloride and vinylidene chloride as well as copolymerisable compounds which improve the affinity for acid or basic dyes, e.g. methallylsulphonate.

Suitable solvents are any solvents which can be used for polyacrylonitrile, in particular dimethylformamide and dimethylacetamide.

Fibres consisting mainly of polyacrylonitrile which have been finished with antistatic finishes in accordance with the invention do not lose their antistatic properties, or only to a slight extent, even after repeated washing. The compounds added according to the invention are readily compatible with the polymers and copolymers described and moreover their antistatic effect is not reduced by the addition of stabilisers, fillers, dyes, pigments, antioxidants, etc..

The examples which follow explain the method of preparation of the antistatic agents according to the invention. The products obtained were added to various polyacrylonitrile solutions which were then spun into fibres by the dry spinning process in known manner. The electrical surface resistance of these fibres was then determined with a tube ohmmeter for measuring high ohmic resistances after 48 hours' air conditioning at 23°C and 50 percent relative humidity and compared with the surface resistance of an unmodified thread.

The fibres were wahsed with a 0.5 percent solution of a commercial detergent at 30°C and air conditioned as described above before each surface resistance measurement was carried out.

The results are summarised in Tables I and II.

EXAMPLE 1

638 Parts of ten times ethoxylated, dried nonylphenol (OH number = 88) were reacted with 98 parts of maleic acid anhydride in an inert gas atmosphere at 100°C for 2 hours. The acid content was determined by titrating a sample against 0.1N NaOH using phenolphthalein indicator. The result was used to calculate the quantity of NaOH (about 38.5 parts) required for neutralising the reaction mixture. The required NaOH was added as a 50 percent aqueous solution at about 70°C.

270 Parts of a 40 percent aqueous sodium bisulphite solution were then added and the reaction mixture, which became foamy, was stirred for 2 hours at 80°C. A sample removed at that time had a residual sulphite content, determined iodometrically, which corresponded to 94.5 percent conversion. Stirring was continued for a further hour at 80°C and the reaction mixture was then left to cool to 60 to 65°C and 1500 parts of methanol were added. After briefly boiling up the reaction mixture, it was acidified with 211 parts of 20 percent sulphuric acid. The solution was filtered and the filtrate was concentrated as much as possible by evaporation under vacuum; the residual solvent content should not exceed 2 percent. The resulting monosodium salt of sulphosuccinic acid monoester was an almost colourless, highly viscous liquid which was miscible in all proportions with 27 percent solutions of acrylonitrile polymers and copolymers in dimethylformamide. Two solutions containing 10 percent of additive, based on the solids content, were spun into fibres by dry spinning.

EXAMPLE 2

Ten times ethoxylated nonylphenol and maleic acid anhydride were reacted together as described in Example 1. The reaction mixture was then neutralised with the titrimetrically determined quantity of lithium hydroxide (about 28 parts) in the form of a concentrated aqueous solution. 320 Parts of a 38 percent aqueous sodium bisulphite solution were then added and the reaction mixture, which became foamy, was stirred for 2.5 hours at 80°C. It was then left to cool to 60 to 70°C and taken up with 1600 parts of methanol. It was suction filtered while still hot to remove inert salts. Both methanol and water were evaporated off under vacuum and an almost colourless, highly viscous liquid was obtained. This liquid, made up in the form of a 55 percent solution in dimethylformamide, was treated with 10 percent, based on the solids content, of 27 percent polyacrylonitrile solutions in dimethylformamide and the resulting solutions were spun dry.

EXAMPLE 3

477 Parts of five times ethoxylated stearyl alcohol (OH number 117.5) were reacted with maleic acid anhydride as described in Example 1. The resulting semiester was neutralised with 45 parts of sodium hydroxide in 45 parts of water, which was the quantity of sodium hydroxide determined by titration to be required for neutralisation. 200 Parts of ethanol were also added so that the mixture could be more easily stirred. 320 Parts of a 38 percent aqueous sodium bisulphite solution were then added and the mixture, which became foamy, is stirred for 2.5 hours at 100°C. When the mixture had cooled down to 60°C, 160 parts of 20 percent sulphuric acid were slowly added and the product was then taken up with 2500 parts of dimethylformamide at 80° to 90°C. The inert salts were filtered off hot and the filtrate was mixed with stirring with 50 parts of active charcoal and then again filtered. The solution was concentrated to 50 – 55 percent on a thin layer evaporator. It was clear and homogeneous at temperatures above 50°C but at room temperature it solidified to a paste with a slight yellowish tinge. The substance was added to polyacrylonitrile solutions at 60°C in amounts corresponding to 10 percent of the solids content and the solutions were then spun into fibres by dry spinning.

EXAMPLE 4

638 Parts of ten times ethoxylated nonylphenol (OH number 88) were reacted with 49 parts of maleic acid anhydride in an inert gas atmosphere at 100°C for 2 hours. 0.5 Parts of hydroquinone were then added and the reaction mixture was heated to 180°–190°C. A water jet vacuum was applied after 3 hours and the reaction mixture was stirred for a further 2 hours. After cooling to 80°C, 49 parts of sodium pyrosulphite dissolved in 200 parts of water were added to the resulting maleic acid diester and the reaction mixture was stirred for 2 hours at 80°C. It was then dissolved hot in 1600 parts of methanol and filtered hot to remove salts present as impurities. The filtrate was then clarified by treating it twice with active charcoal, each time with 60 parts. The filtrate was concentrated as much as possible by evaporation and a mass which was pasty at room temperature and readily soluble in dimethylformamide was obtained. This substance was miscible in all proportions with polyacrylonitrile solutions. Polyacrylonitrile fibres containing 10 percent of this additive have good antistatic properties which are resistant to washing.

EXAMPLE 5

621.5 Parts of eight times ethoxylated stearylamine (OH number 90.3) were reacted with 196 parts of maleic acid anhydride and then with 550 parts of a 40 percent aqueous sodium bisulphite solution as in Example 1 and worked up.

A 50 percent solution of the product in dimethylformamide was added to 27 percent polyacrylonitrile solutions in amounts such that the polyacrylonitrile solutions contained 10 percent of the product, based on the solids content.

EXAMPLE 6

490 Parts of seven times ethoxylated lauryl alcohol (OH number 114.5) were dissolved in 200 parts of anhydrous dimethylformamide together with 120 parts of thoroughly dehydrated triethylamine. A solution of 140 parts of cyclic $\beta$-sulphopropionic acid anhydride in 400 parts of dimethylformamide was slowly added dropwise at 60°C and the reaction mixture was then stirred at 60° to 70°C for 4 hours. The reaction mixture was then suction filtered and the resulting dimethylformamide solution was added to polyacrylonitrile solutions in amounts such that the polyacrylonitrile solutions contained 10 percent by weight, based on the solids content.

EXAMPLE 7

770 Parts of ten times ethoxylated stearyl alcohol (OH number 73) were reacted with 49 parts of maleic acid anhydride as described in Example 4. The reaction mixture was aerated with nitrogen and left to cool to room temperature and 110 parts of dimethylphosphite were added. A 20 percent solution of sodium methylate in methanol was then added in small portions until the exothermic reaction was complete. Not more than 15 parts of the methylate solution should be used up by the end of the reaction and the reaction temperature should not exceed 70°C. When all the solution had been added, 100 parts of water were added and 75 parts of 50 percent aqueous sodium hydroxide solution were then run into the reaction mixture in the course of 3 hours at 30°C. The reaction mixture was then stirred until it had a pH of 7 to 8 and the product was then dissolved in 1000 parts of dimethylformamide at 80°C and filtered. The water was evaporated off on a thin layer evaporator in a vacuum at 60° to 80°C and the content was then determined in an aliquot part of the solution by complete removal of the dimethylformamide by evaporation. The product was added to polyacrylonitrile solutions in amounts corresponding to a concentration of 10 percent by weight of the product in the solutions, based on the solids content.

EXAMPLE 8

770 Parts of ten times ethoxylated stearyl alcohol were reacted with 98 parts of maleic acid anhydride according to Example 1. 127 Parts of trimethylphosphite were added and the reaction mixture was stirred for 4 hours at 80°C. It was then thoroughly washed out with nitrogen and left to cool to 50°C. 224 Parts of a 20 percent aqueous potassium hydroxide solution were then added. After 5 hours' stirring at 50°C, the reaction mixture was neutralised with 20 percent sulphuric acid and taken up with 1000 parts of dimethylformamide at 80°C and filtered. The water was evaporated off on a thin layer evaporator. The content was determined in a small part of the solution by complete evaporation of the solvent. The product was added to polyacrylonitrile solutions to produce concentrations of 10 percent by weight, based on the solids content.

EXAMPLE 9

648 Parts of ten times ethoxylated nonyl phenol (OH number 87) were reacted with 98 parts of maleic acid anhydride as described in Example 1. The resulting semiester was stirred into a solution of 20 parts of water, 150 parts of methyl-bis-(2-hydroxypropyl)amine and 64 parts of sulphur dioxide in 250 parts of ethanol at 20° to 30°C. A slightly exothermic reaction took place, resulting in the production of the diammonium salt of sulphosuccinic acid monoester. Stirring was continued for 60 minutes at 90°C to complete the reaction. Sulphite was now practically completely absent according to iodometric titration.

The sulphosuccinic acid monoester was isolated as an oily, almost colourless liquid by evaporating off the solvent under vacuum. This liquid was directly added to polyacrylonitrile solutions in amounts corresponding to concentrations of 10 percent by weight, based on the solids content.

TABLE I

Electrical surface resistance of acrylonitrile copolymers of 94 percent by weight of acrylonitrile, 5 percent by weight of methyl acrylate and 1 percent by weight of methallylsulphonate to which 10 percent by weight, based on the total quantity, of the antistatic agents described in the Examples have been added.

| Product from example | Original resistance Ω | After first washing Ω | After 3 washings Ω | After 5 washings Ω | After 10 washings Ω |
|---|---|---|---|---|---|
| without additive | $9.10^{12}$ | $>10^{13}$ | $>10^{13}$ | $>10^{13}$ | $>10^{13}$ |
| 1 | $1.10^{10}$ | $7.10^{10}$ | $2.10^{11}$ | $5.10^{11}$ | $4.10^{11}$ |
| 2 | $2.10^{11}$ | $8.10^{10}$ | $4.10^{11}$ | $3.10^{11}$ | $5.10^{11}$ |
| 3 | $2.10^{10}$ | $3.10^{10}$ | $1.10^{11}$ | $4.10^{11}$ | $4.10^{11}$ |
| 4 | $2.10^{11}$ | $8.10^{10}$ | $7.10^{10}$ | $9.10^{10}$ | $1.10^{11}$ |
| 5 | $3.10^{10}$ | $1.10^{10}$ | $2.10^{10}$ | $5.10^{10}$ | $3.10^{10}$ |
| 6 | $6.10^{10}$ | $4.10^{10}$ | $7.10^{10}$ | $5.10^{10}$ | $7.10^{10}$ |
| 7 | $9.10^{10}$ | $7.10^{10}$ | $9.10^{10}$ | $2.10^{11}$ | $9.10^{10}$ |
| 8 | $3.10^{10}$ | $5.10^{10}$ | $6.10^{10}$ | $5.10^{10}$ | $7.10^{10}$ |
| 9 | $9.10^{10}$ | $7.10^{10}$ | $7.10^{10}$ | $8.10^{10}$ | $9.10^{10}$ |

TABLE II

Electrical surface resistance of acrylonitrile copolymers and 61.5 percent by weight of acrylonitrile, 37 percent by weight of vinylidene chloride and 1.5 percent by weight of methallylsulphonate to which 10 percent by weight, based on the total quantity, of the antistatic agents described in the Examples have been added.

| Product from example | Original resistance Ω | After first washing Ω | After 5 washings Ω | After 10 washings Ω |
|---|---|---|---|---|
| without additive | $8.10^{12}$ | $10^{13}$ | $10^{13}$ | $10^{13}$ |
| 1 | $9.10^{10}$ | $7.10^{10}$ | $10^{11}$ | $2.10^{11}$ |
| 2 | $1.10^{11}$ | $7.10^{10}$ | $2.10^{10}$ | $9.10^{10}$ |
| 3 | $3.10^{10}$ | $2.10^{10}$ | $2.10^{10}$ | $4.10^{10}$ |
| 4 | $1.10^{11}$ | $8.10^{10}$ | $7.10^{10}$ | $9.10^{10}$ |
| 5 | $2.10^{10}$ | $2.10^{10}$ | $5.10^{10}$ | $6.10^{10}$ |
| 6 | $4.10^{10}$ | $3.10^{10}$ | $6.10^{10}$ | $5.10^{10}$ |
| 7 | $1.10^{11}$ | $7.10^{10}$ | $8.10^{10}$ | $2.10^{11}$ |
| 8 | $5.10^{10}$ | $5.10^{10}$ | $8.10^{10}$ | $7.10^{10}$ |
| 9 | $2.10^{11}$ | $1.10^{11}$ | $9.10^{10}$ | $1.10^{11}$ |

What we claim is:

1. A polymeric acrylonitrile composition comprising a polymer with at least 60 percent by weight of polymerized acrylonitrile and as an antistatic agent, 1 to 20 percent by weight, based on the quantity of polymer, of at least one compound of the general formula

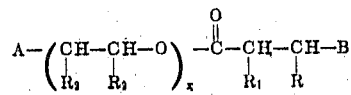

in which
R and $R_1$ are different from each other and represent hydrogen,

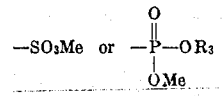

in which
Me stands for Li, Na, $NH_4$, alkylammonium, $Mg_{/2}$, $Ca_{/2}$ or $Ba_{/2}$,
$R_2$ represents hydrogen or methyl,
$R_3$ represents a $C_1$–$C_5$ alkyl radical and
A represents radicals of the following formulae

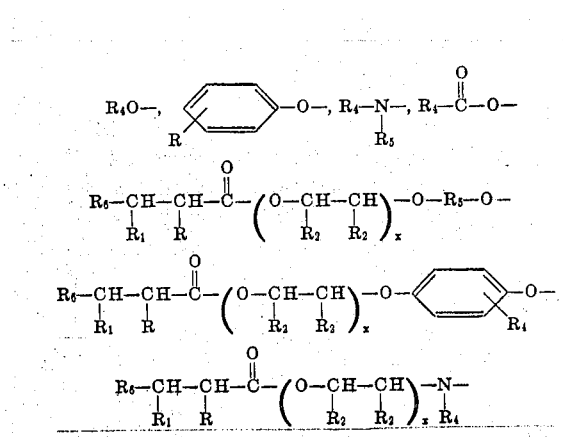

in which
$R_4$ denotes a $C_1$–$C_{30}$ alkyl radical,
$R_5$ denotes a $C_3$–$C_{30}$ alkyl radical and
$R_6$ denotes the radicals —$CO_2H$ and $CO_2Me$,
B denotes hydrogen, $CO_2H$, $CO_2Me$ or

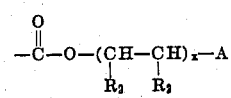

and
x represents integers of from 1 to 50.

2. The polymer of claim 1 wherein the acrylonitrile is copolymerized with a vinyl compound.

3. The polymer of claim 2 wherein said vinyl compound is an acrylic or methacrylic compound.

4. The polymer of claim 3 wherein said vinyl compound is a member selected from the group consisting of acrylic acid ester or amide, methacrylic acid ester or amide, vinyl chloride, vinylidene chloride and a mixture thereof.

5. A polymer as claimed in claim 4 comprising copolymerisable compounds which contain acidic or basic groups which have affinities for dyes.

6. A process for the production of a shaped acrylonitrile polymer product from a polymer as claimed in claim 1, wherein the antistatic agent is added to the acrylonitrile polymer before shaping.

7. A process for the production of a thread or foil of an acrylonitrile polymer as claimed in claim 1, in which the antistatic agent is added to a spinnable solution of the polymer.

8. A thread or foil of an acrylonitrile polymer as claimed in claim 1.

* * * * *

UNITED STATES PATENT OFFICE
CERTIFICATE OF CORRECTION

Patent No. 3,821,176  Dated June 28, 1974

Inventor(s) Gunter Arend et al

It is certified that error appears in the above-identified patent and that said Letters Patent are hereby corrected as shown below:

Column 5, Line 22, "$H_{21}C_{15}$" should read ---$H_{31}C_{15}$---.

Column 10, Line 21,

"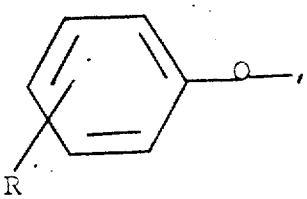"

should read

---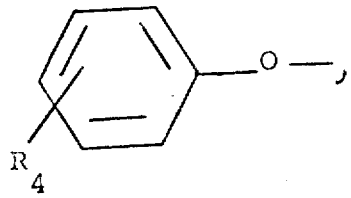---

Signed and sealed this 11th day of March 1975.

(SEAL)
Attest:

RUTH C. MASON
Attesting Officer

C. MARSHALL DANN
Commissioner of Patents
and Trademarks